(12) United States Patent
Ahmavaara et al.

(10) Patent No.: US 8,155,078 B2
(45) Date of Patent: Apr. 10, 2012

(54) SYSTEMS AND METHODS FOR USING INTERNET MOBILITY PROTOCOLS WITH NON INTERNET MOBILITY PROTOCOLS

(75) Inventors: Kalle I. Ahmavaara, San Diego, CA (US); Vidya Narayanan, San Diego, CA (US); Wolfgang Granzow, Heroldsberg (DE)

(73) Assignee: QUALCOMM Incorporated, San Diego, CA (US)

( * ) Notice: Subject to any disclaimer, the term of this patent is extended or adjusted under 35 U.S.C. 154(b) by 616 days.

(21) Appl. No.: 11/870,294

(22) Filed: Oct. 10, 2007

(65) Prior Publication Data

US 2008/0175201 A1 Jul. 24, 2008

Related U.S. Application Data

(60) Provisional application No. 60/862,416, filed on Oct. 20, 2006.

(51) Int. Cl.
 *H04W 4/00* (2009.01)
(52) U.S. Cl. .................. 370/331; 370/465; 455/436
(58) Field of Classification Search .......... 370/331–338, 370/465–467; 455/436–444
 See application file for complete search history.

(56) References Cited

U.S. PATENT DOCUMENTS

| 7,437,154 | B2 * | 10/2008 | Hahn | 455/426.2 |
| 7,593,362 | B1 * | 9/2009 | Casati et al. | 370/328 |
| 2005/0117556 | A1 * | 6/2005 | Lee et al. | 370/338 |
| 2005/0227667 | A1 * | 10/2005 | Jung | 455/408 |
| 2007/0165655 | A1 * | 7/2007 | Haumont | 370/401 |
| 2007/0207818 | A1 * | 9/2007 | Rosenberg et al. | 455/461 |
| 2007/0253371 | A1 * | 11/2007 | Harper et al. | 370/331 |
| 2008/0194271 | A1 * | 8/2008 | Bedekar et al. | 455/456.2 |
| 2008/0256220 | A1 * | 10/2008 | Bachmann et al. | 709/222 |
| 2009/0190549 | A1 * | 7/2009 | Kim et al. | 370/331 |

FOREIGN PATENT DOCUMENTS

| CN | 1528071 A | 9/2004 |
| EP | 1209875 | 5/2002 |
| TW | I235570 | 7/2005 |
| TW | I243620 | 11/2005 |
| WO | WO2006055939 | 5/2006 |

OTHER PUBLICATIONS

Soliman H et al: "Hierarchical Mobile IPv6 Mobility Management (HMIPv6); RFC 4140" Internet Engineering Task Force (IETF), Aug. 2005, pp. 1-29, XP015041862.
Ye Min-Hua et al.: "The Mobile IP handoff between hybrid networks" The 13th IEEE International Symposium on Personal, Indoor and Mobile Radio Communications (PIMRC), vol. 1, Sep. 2002, pp. 265-269, XP010614228.

(Continued)

*Primary Examiner* — Gary Mui
(74) *Attorney, Agent, or Firm* — Francois A. Pelaez

(57) ABSTRACT

A method for using Internet mobility protocols with non Internet mobility protocols is described. A first gateway node communicates with a second gateway node using a first protocol. The first protocol is a non Internet mobility protocol. A home address (HoA) for a mobile node is managed by the second gateway node. Updates regarding the location of the mobile node within a domain are received using a second protocol. The second protocol is an Internet mobility protocol. Intra-domain mobility for the mobile node is managed by the second gateway node using the second protocol.

22 Claims, 10 Drawing Sheets

OTHER PUBLICATIONS

Zhong Ren et al.: "Integration of Mobile IP and Multi-Protocol Label Switching" IEEE International Conference on Communications (ICC), vol. 7, Jun. 11, 2001, pp. 2123-2127, XP010553693.
International Search Report—PCT/US2007/081998, International Search Authority—European Patent Office—Sep. 10, 2008.

Written Opinion—PCT/US2007/081998, International Search Authority—European Patent Office—Sep. 10, 2008.

Taiwan Search Report—TW096139581—TIPO—Jun. 3, 2011.

* cited by examiner

SYSTEMS AND METHODS FOR USING INTERNET MOBILITY PROTOCOLS WITH NON INTERNET MOBILITY PROTOCOLS

RELATED APPLICATIONS

This application is related to and claims priority from U.S. Patent Application Ser. No. 60/862,416 filed Oct. 20, 2006, for METHOD AND APPARATUS FOR NETWORK MOBILITY, with inventors Kalle Ahmavaara et al., which is incorporated herein by reference.

TECHNICAL FIELD

The present disclosure relates generally to communications and communication devices. More specifically, the present disclosure relates to systems and methods for using Internet mobility protocols with non Internet mobility protocols.

BACKGROUND

Originally, Internet Protocol (IP) providing access to the Internet was designed for stationary users. The basic IP concept does not support user mobility: The IP addresses are assigned to network interfaces depending on their location in the network. The first part of an IP address (NETID) is common to all interfaces that are linked to the same Internet subnetwork. This scheme prevents a user (a mobile host) from being reachable while moving over different Internet subnetworks, i.e. while changing the physical interface.

A Mobile IP enables a mobile host to change its point of attachment from one Internet subnetwork to another without changing its IP address. Mobile IP provides flexibility in implementing IP services, such as IP Quality of Service (QoS). However, several legacy communications systems function with protocols that are non-IP based. Therefore, benefits may be realized by providing systems and methods for interacting Internet mobility protocols with non Internet mobility protocols.

DETAILED DESCRIPTION

Figure 1:
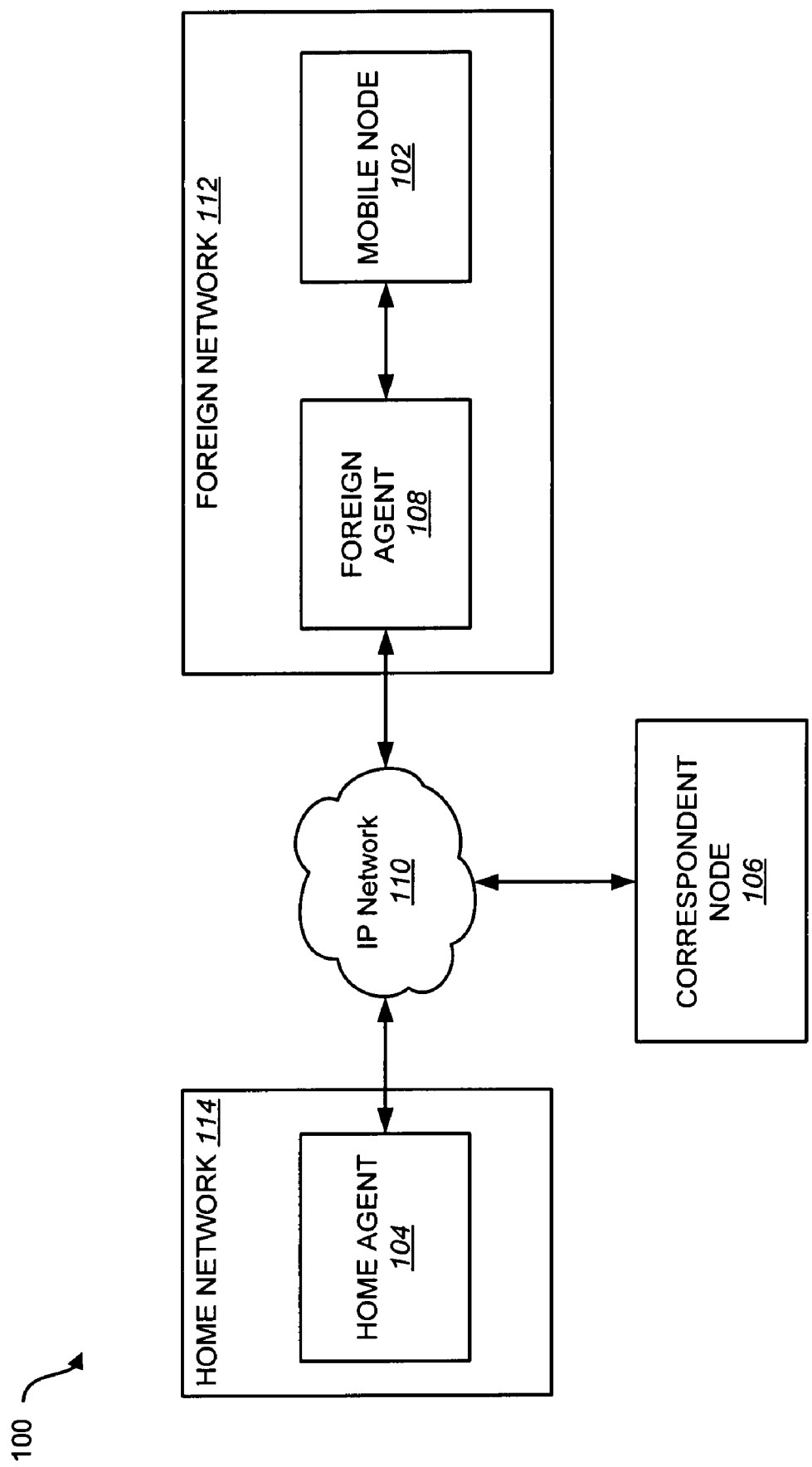
FIG. 1 is a block diagram of a communications network implementing mobile Internet Protocols (MIP) to enable communications with a mobile node.

A method for using Internet mobility protocols with non Internet mobility protocols is described. A first gateway node communicates with a second gateway node using a first protocol. The first protocol is a non Internet mobility protocol. A home address (HoA) for a mobile node is managed by the second gateway node. Updates regarding the location of the mobile node within a domain are received using a second protocol. The second protocol is an Internet mobility protocol. Intra-domain mobility for the mobile node is managed by the second gateway node using the second protocol.

The method may be implemented by a second gateway node comprising a servicing general packet radio services support node (SGSN) collocated with a local mobility agent. In another example, the method may be implemented by a second gateway node comprising an Evolved Packet System (EPS) serving gateway node (SGW) collocated with a local mobility agent.

The first protocol may be a general packet radio services tunneling protocol (GTP). The second protocol may be a proxy mobile Internet Protocol (PMIP). The second protocol may also be a Mobile Internet Protocol (MIP). In one example, the updates regarding the location of the mobile node are received from one or more access routers using the second protocol.

In one example, data packets are received at a local mobility agent from an access router using an Internet Protocol (IP) based tunnel. The data packets may be provided to a servicing node. The data packets may be tunneled from the servicing node to the first gateway node using a non-IP tunnel.

In another example, data packets are received at a servicing node from the first gateway node using a non-IP tunnel. The data packets may be provided to a local mobility agent. The data packets may be tunneled to a corresponding access router using an IP based tunnel.

The second protocol may be used for communications between a local mobility agent and a home agent. The first protocol may be used for communications between a servicing node and one or more access routers.

A gateway device that is configured to use Internet mobility protocols with non Internet mobility protocols is also described. The gateway device includes a processor and memory in electronic communication with the processor. Instructions are stored in the memory. The gateway device communicates with a second gateway node using a first protocol. The first protocol is a non Internet mobility protocol. A home address (HoA) is managed for a mobile node. Updates regarding the location of the mobile node within a domain are received using a second protocol. The second protocol is an Internet mobility protocol. Intra-domain mobility for the mobile node is managed using the second protocol.

A computer-program product for using Internet mobility protocols with non Internet mobility protocols is also described. The computer-program product includes a computer readable medium that includes instructions. The instructions include code for communicating with a first gateway node using a first protocol. The first protocol is a non Internet mobility protocol. The instructions also include code for managing a home address (HoA) for a mobile node and code for receiving updates regarding the location of the mobile node within a domain using a second protocol. The second protocol is an Internet mobility protocol. The instructions further include code for managing intra-domain mobility for the mobile node using the second protocol.

An apparatus for using Internet mobility protocols with non Internet mobility protocols is also described. The apparatus includes means for communicating with a first gateway node using a first protocol. The first protocol is a non Internet mobility protocol. The apparatus also includes means for managing a home address (HoA) for a mobile node and means for receiving updates regarding the location of the mobile node within a domain using a second protocol. The second protocol is an Internet mobility protocol. The apparatus further includes means for managing intra-domain mobility for the mobile node using the second protocol.

Several exemplary embodiments are now described with reference to the Figures. This detailed description of several exemplary embodiments, as illustrated in the Figures, is not intended to limit the scope of the claims.

The word "exemplary" is used exclusively herein to mean "serving as an example, instance or illustration." Any embodiment described as "exemplary" is not necessarily to be construed as preferred or advantageous over other embodiments.

As used herein, the terms "an embodiment," "embodiment," "embodiments," "the embodiment," "the embodiments," "one or more embodiments," "some embodiments," "certain embodiments," "one embodiment," "another embodiment" and the like mean "one or more (but not necessarily all) embodiments," unless expressly specified otherwise.

The term "determining" (and grammatical variants thereof) is used in an extremely broad sense. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

Internet Protocol mobility (MIP) provides more flexibility in implementing IP services, such as IP Quality of Service (QoS). IP mobility may be host based (e.g., MIP) or network-based (e.g., proxy MIP). Mobility management may be categorized into two levels for optimal operation. The first level may be global mobility or mobility across different technologies and domains. Host based mobility (i.e., MIP) may be implemented in global mobility management.

The second level may be local (intra-domain) mobility. Host based or network-based mobility may be employed in a hierarchical fashion along with mobile IP to realize local mobility. For example, network-based mobility may be best suited for intra-technology mobility. In one embodiment, local mobility reduces updates to a global entity such as a home agent. Hierarchical mobile IP (HMIP), fast mobile IP (FMIP), proxy mobile IP (PMIP) and network-based local mobility management (NETLMM) are examples of local mobility protocols. Many combinations of global and local mobility management protocols are available.

Advantages may be realized by using IP mobility protocols with non-IP protocols implemented in legacy communications systems according to the present systems and methods. Regarding legacy systems, the interface between a Gateway General Packet Radio Services Support Node (GGSN) and a Servicing General Packet Radio Services Support Node (SGSN) may be a roaming interface which is typically handled via a General Packet Radio Services Tunneling Protocol (GTP) in a legacy 3GPP network. Thus, migration of the legacy system to an architecture that includes IP based protocols needs an intermediate state of co-existence with GTP on that interface. As such, the present system and methods allows the global or local mobility to be handled by legacy protocols, such as GTP.

FIG. 1 is a block diagram of a communications network 100 implementing mobile IP (MIP) to enable communications with a mobile node 102. A home agent 104, a correspondent node 106 and a foreign agent 108 may all communicate with one another through an IP network 110.

The mobile node 102 may change its location from one network or subnetwork to another. In FIG. 1 the mobile node 102 is illustrated in a foreign network 112. The mobile node 102 may obtain an IP address and communicate with other nodes, including the correspondent node 106, on the IP network 110 using its IP address. The mobile node 102 may obtain an IP address from the home agent 104. The IP address from the home agent 104 may be referred to as a home address (HoA). The home address is a long-term IP address on the home network 114. When the mobile node 102 is visiting a foreign network 112, a care-of address may be associated with the mobile node 102 to reflect the mobile node's current point of attachment to the IP network 110. When sending out data, the mobile node 102 typically uses its home address as the source address for IP datagrams.

The home agent 104 is in a home network 114 of the mobile node 102 and maintains the current location information for each of its mobile nodes 102. The home agent 104 stores the information necessary to forward data to the mobile nodes 102 belonging to the home network 114. This information may be stored in mobility bindings. The mobility bindings may include a number of records that include the home address, the associated care-of address, and the lifetime of that association. The home agent 104 may also receive data from the correspondent node 106 and may forward the data to the intended mobile node 102.

The home network 114 has a network prefix that matches that of the mobile node's 102 home address. IP routing mechanisms operate to deliver IP data sent to a mobile node's 102 home address to the mobile node's 102 home network 114. The home network 114 may be a virtual network.

The foreign agent 108 is an agent in another network 112 (not the home network 114) where the mobile node 102 is currently located. The foreign agent 108 cooperates with the home agent 104 to deliver data to the mobile node 102 when it is out of its home network 114.

One or more intervening nodes (not shown) may be in the communication path between the home agent 104 and the foreign agent 108. The intervening nodes (not shown) may be on the IP network 110 and are typically routers. Thus, as data is sent between the home agent 104 and the foreign agent 108, it travels through and is routed by one or more intervening nodes (not shown).

The network 100 in FIG. 1 may be implemented as different kinds of networks. One possible network in which mobile IP and the embodiments disclosed herein may be implemented is illustrated in FIG. 2.

Figure 2:
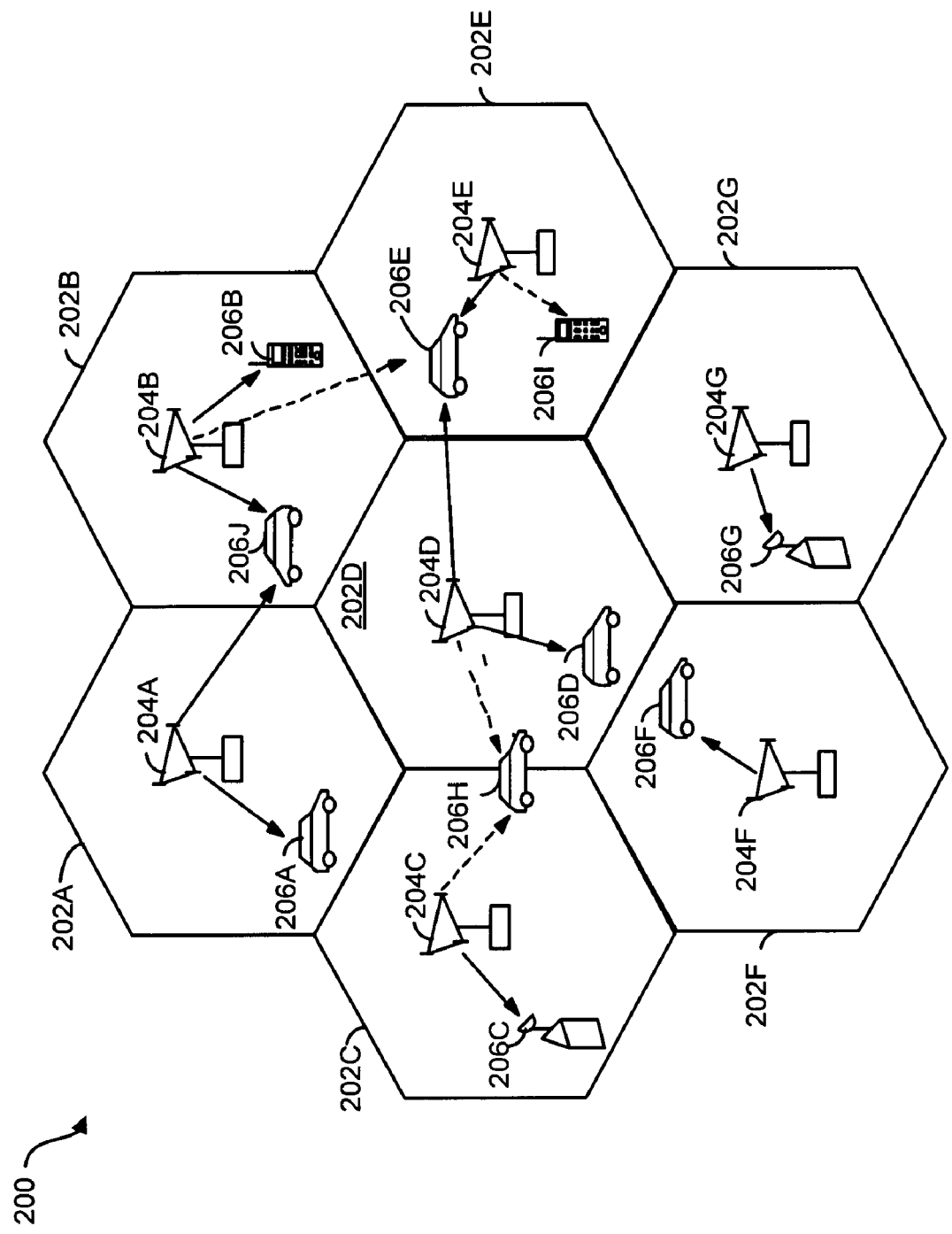
FIG. 2 is a block diagram illustrating an example of a communications system that supports a number of users.

FIG. 2 serves as an example of a communications system 200 that supports a number of users and is capable of implementing at least some aspects of the embodiments discussed herein. Any of a variety of algorithms and methods may be used to schedule transmissions in the system 200. The system 200 provides communication for a number of cells 202A-202G, each of which is serviced by a corresponding base station 204A-204G, respectively. In one embodiment, some of the base stations 204 have multiple receive antennas and others have only one receive antenna. Similarly, some of the base stations 204 have multiple transmit antennas, and others have single transmit antennas. There are no restrictions on the combinations of transmit antennas and receive antennas. Therefore, it is possible for a base station 204 to have multiple transmit antennas and a single receive antenna, or to have multiple receive antennas and a single transmit antenna, or to have both single or multiple transmit and receive antennas.

The terminals 206 in the coverage area may be fixed (i.e., stationary) or mobile. The mobile node 102 of FIG. 1 may be a mobile terminal 206. As shown in FIG. 2, various terminals 206 are dispersed throughout the system. Each terminal 206 communicates with at least one and possibly more base stations 204 on the downlink and uplink at any given moment depending on, for example, whether soft handoff is employed or whether the terminal is designed and operated to (concurrently or sequentially) receive multiple transmissions from multiple base stations.

The downlink refers to transmission from the base station 204 to the terminal 206, and the uplink refers to transmission from the terminal 206 to the base station 204. In one embodiment, some of terminals 206 have multiple receive antennas and others have only one receive antenna. In FIG. 2, base station 204A transmits data to terminals 206A and 206J on the downlink, base station 204B transmits data to terminals 206B and 206J, base station 204C transmits data to terminal 206C, and so on.

Figure 3:
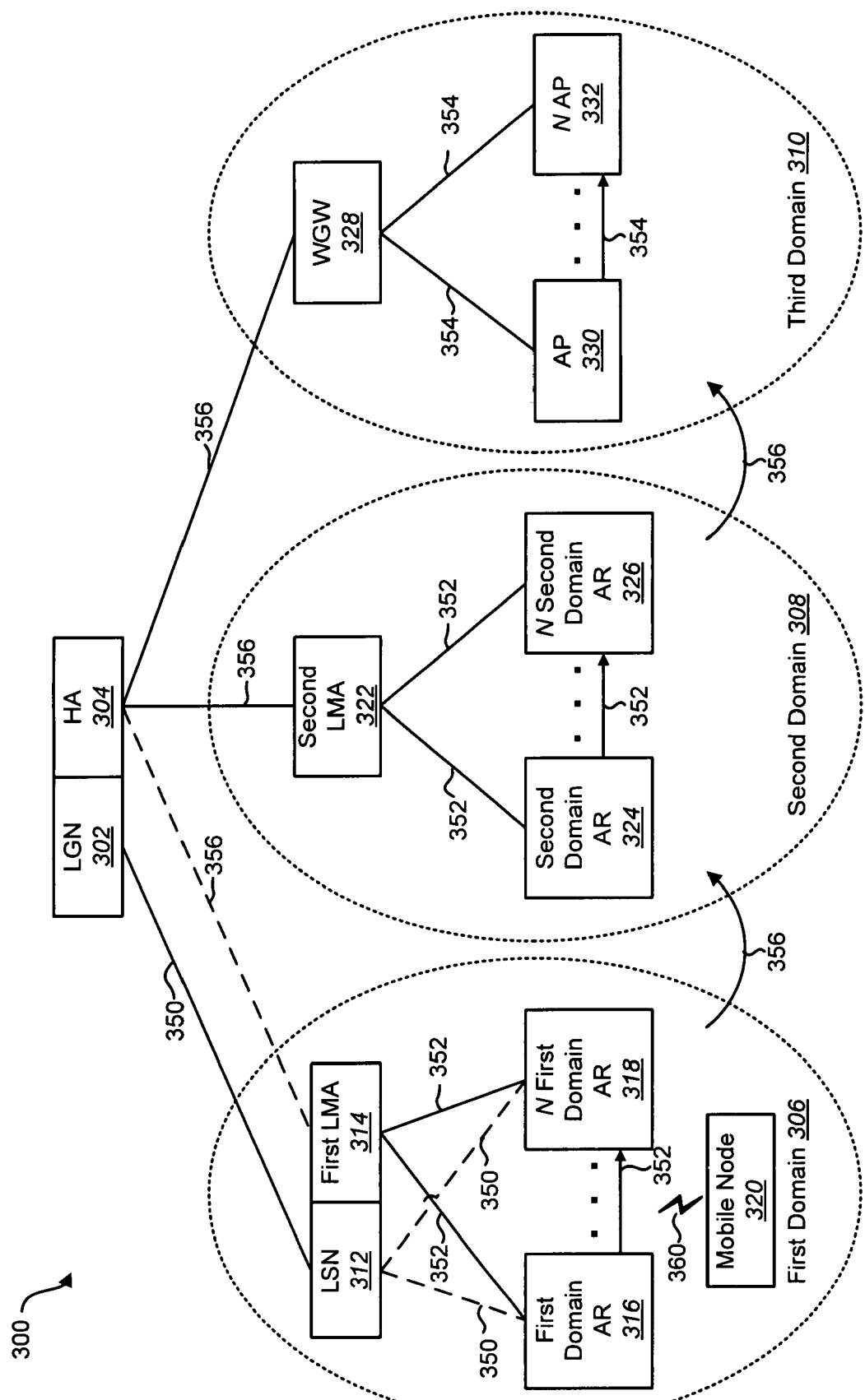
FIG. 3 illustrates one embodiment of a mobility architecture in which the present systems and methods may be implemented.

FIG. 3 illustrates one embodiment of a mobility architecture 300 in which the present systems and methods may be implemented. In one embodiment, a legacy gateway node (LGN) 302 may be collocated with a MIP home agent (HA) 304. The LGN 302 may be a Gateway General Packet Radio Services Support Node (GGSN). The LGN 302 may act as a gateway between a General Packet Radio Services (GPRS) wireless data network and other networks such as the Internet or private networks. The LGN 302 may be an anchor point that facilitates the mobility of a mobile node 320 in GPRS networks. The LGN 302 may maintain routing necessary to tunnel Protocol Data Units (PDUs) (hereafter, "data packets") to a legacy servicing node (LSN) 312. The LGN 302 may interface with the LSN 312 via a legacy protocol 350. In one embodiment, the legacy protocol 350 is the GPRS Tunneling Protocol (GTP). In another embodiment, a first local mobility agent 314 (LMA) may interface directly with the HA 304 over a global IP mobility protocol 356 (e.g. MIP).

The LSN 312 may be a Servicing GPRS Support Node (SGSN). The LSN 312 may directly or indirectly deliver/receive data packets to/from mobile nodes 320 within its geographical service area (i.e. a first domain 306). In one embodiment, the LSN 312 is collocated with the first LMA 314. The first LMA 314 may provide Internet Protocol (IP) based local mobility.

In one embodiment, within the first domain 306, a network-based mobility protocol 352, such as proxy mobile IP (PMIP), may be employed. The network-based protocol 352 may be executed between a plurality of first domain access routers 316, 318 (ARs) and the first LMA 314. One example of an AR may be a base station. However, an AR may be implemented in various other configurations. In another embodiment, the legacy protocol 350 may be implemented between the LSN 312 and the plurality of ARs 316, 318. The mobile node 320 may communicate with the plurality of ARs 316, 318 over a communications medium 360. In one embodiment, the mobile node 320 acquires a home address (HoA) for mobile IP (MIP). The mobile node 320, however, may detect the first domain 306 as the home network. In other words, when the LGN 302-LSN 312 interface is a non-IP protocol 350 (such as the GTP), the entire local domain (e.g. the first domain 306) may appear as the home network from a MIP perspective to the mobile node 320. If there is a prior binding upon detection of the home network, the mobile node 320 may deregister with the HA 304. If the mobile node 320 is bootstrapping, it 320 may not create a binding at the HA 304.

The HA/LGN 304, 302 may delegate the HoA to the first LMA 314. Network-based mobility may allow the HoA to be mapped to the correct AR 316, 318 at which the mobile node 320 is located. The location may be updated at the first LMA 314 by the ARs 316, 318 as the mobile node 320 moves within the first domain 306. In one embodiment, the home subnet may be reachable globally via the HA/LGN 304, 302. The first LMA 314 may temporarily handle intra-domain mobility for the HoA. However, the first LMA 314 may not advertise that the HoA is reachable.

A second domain 308 may be another local IP mobility domain. A second LMA 322 may be included in the second domain 308 and have a plurality of second domain ARs 324, 326 attached to it 322. An IP mobility protocol 352 may be executed between the second LMA 322 and the corresponding ARs 324, 326. In one embodiment, the IP mobility protocol 352 is the proxy mobile IP (PMIP) protocol. The IP mobility protocol 352 may also be implemented for communications between the second domain ARs 324, 326. In addition, the global IP mobility protocol 356 may be executed between the second LMA 322 and the HA 304.

A third domain 310 may implement a wireless local area network (WLAN) and may include a wireless gateway 328 (WGW) that directly interfaces with the HA 304 through the global IP mobility protocol 356. In one embodiment, the WGW 328 is a virtual private network gateway (VPN GW). Layer 2 (L2) mobility protocols 354 may be used for communications between the WGW 328 and a plurality of access points 330, 332 (APs). Multiple layer 3 (L3) points of attachment (not shown) may also be present under the WGW 328. For example, an IP security (IPsec) VPN may be present between the WGW 328 and a mobile node located in the third domain 310. L2 mobility protocols 354 may also be implemented for communications between the APs 330, 332.

Mobility across any of the domains 306, 308, 310 may trigger MIP binding updates from the mobile node 320 to the HA 304. Intra-domain mobility may be transparent to the mobile node 320. Global IP mobility protocols 356 (e.g. MIP) may be executed between the first domain 306, the second domain 308 and the third domain 310.

Figure 4:
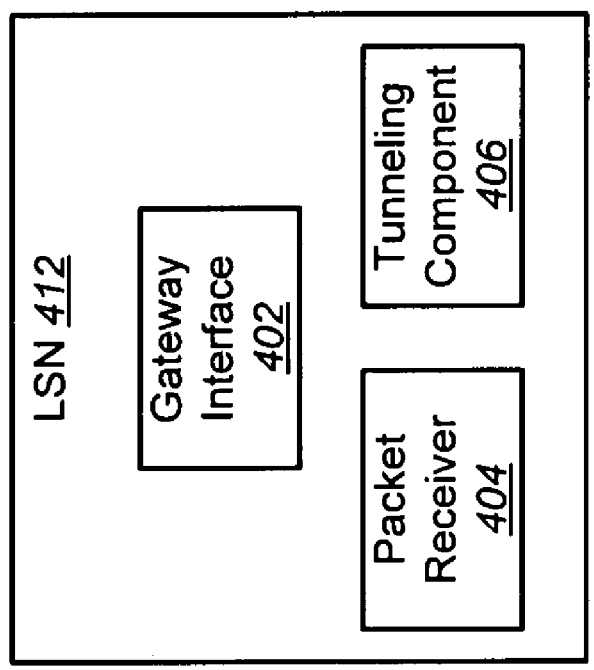
FIG. 4 is a block diagram illustrating one embodiment of a legacy servicing node.

FIG. 4 is a block diagram illustrating one embodiment of the LSN 412.

The LSN 412 may include a gateway interface 402, a packet receiver 404 and a tunneling component 406. The gateway interface 402 may facility the LSN 412 to interface with the LGN 302 via a legacy protocol 350 such as the GTP. The packet receiver 404 may receive data packets from the LGN 302. In another embodiment, the packet receiver 404 receives data packets from the first LMA 314. The tunneling component 406 may tunnel the data packets received from the LGN 302 to the first LMA 314. The tunneling component 406 may implement a non-IP based tunnel to send the data packets (e.g. GTP).

Figure 5:
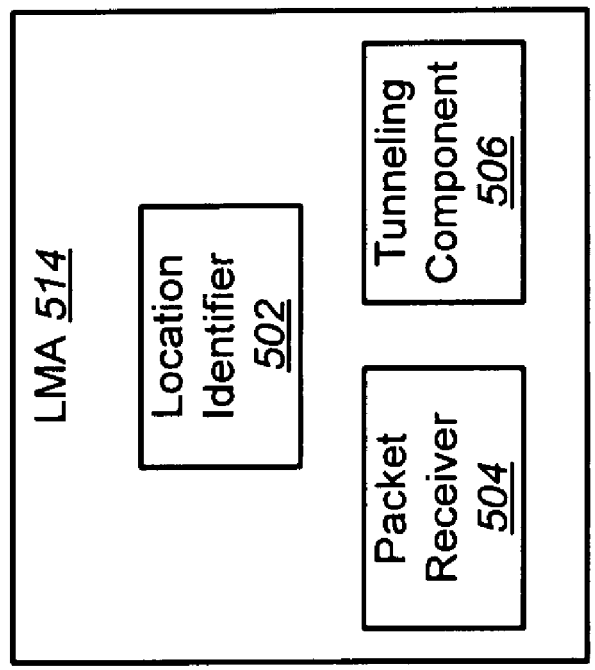
FIG. 5 is a block diagram illustrating one embodiment of a local mobility agent.

FIG. 5 is a block diagram illustrating one embodiment of a LMA 514. The LMA 514 may be the first LMA 314 illustrated in FIG. 3. The LMA 514 may include a location identifier 502, a packet receiver 504 and a tunneling component 506. The location identifier 502 may identify the location of the mobile node 320 as it moves within the domain in which the LMA 514 resides. The location of the mobile node 320 may be updated to the location identifier 502 by ARs within the domain. The packet receiver 504 may receive data packets from the LSN 412. In another embodiment, the packet receiver 504 receives data packets from one or more ARs. The tunneling component may tunnel the data packets received from the LSN 412 to the corresponding AR. The tunneling component 506 may implement an IP-based tunnel to send the data packets to the corresponding AR.

Figure 6:
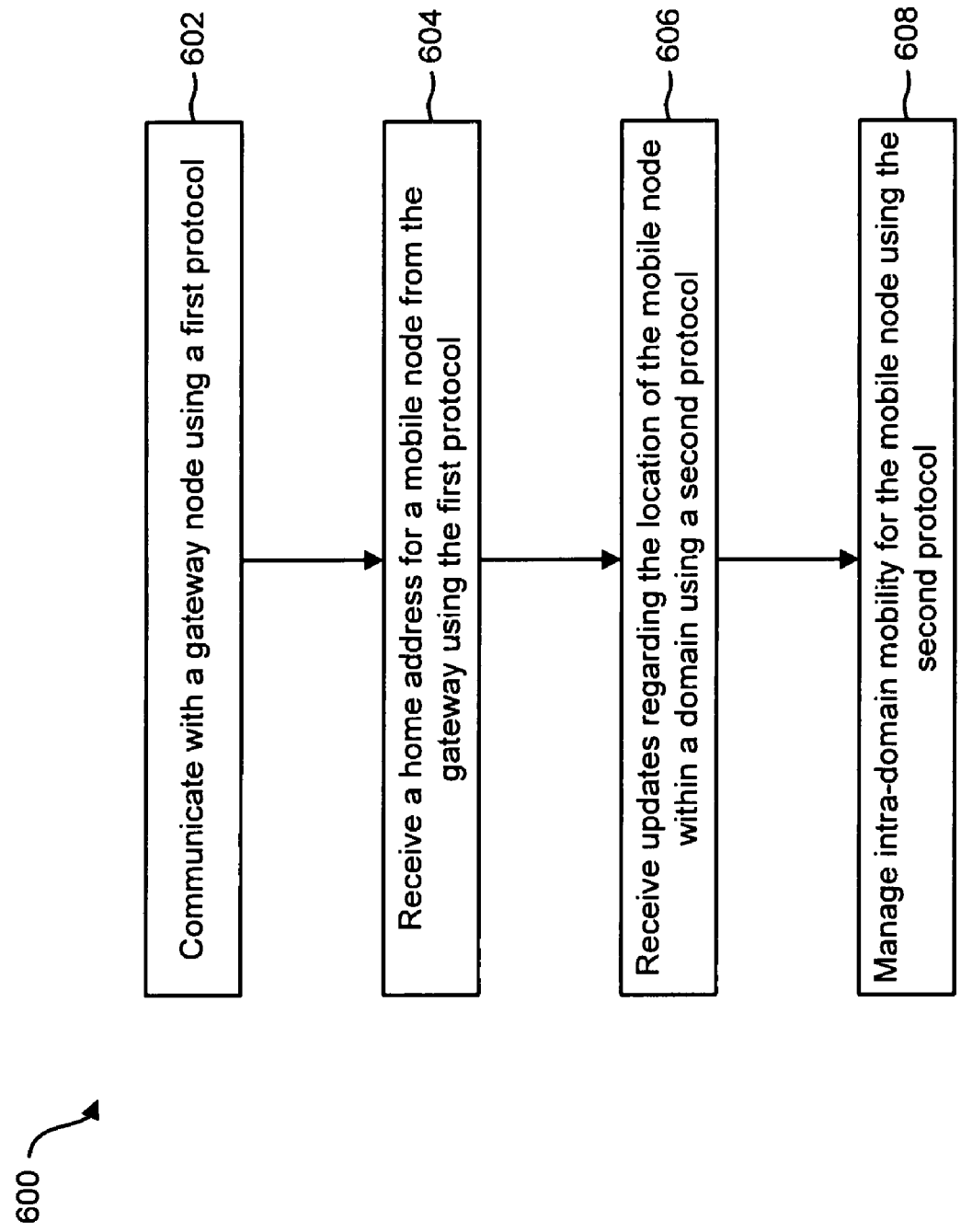
FIG. 6 is a flow diagram illustrating a method for using IP based mobility protocols and non-IP based mobility protocols.

FIG. 6 is a flow diagram illustrating a method 600 for using IP based mobility protocols and non-IP based mobility protocols. The method 600 may be implemented by the LSN 312 and the first LMA 314 illustrated in FIG. 3. The method 600 may also be implemented by an Evolved Packet System (EPS) serving gateway node (SGW) that is collocated with the first LMA 314. In one embodiment, communication is established 602 with a gateway node using a first protocol. The gateway node may be the LGN 302 and the HA 304 illustrated in FIG. 3. The LSN 312 component may communicate with the LGN 302 component using the first protocol. In one embodiment, the first protocol is a legacy mobility protocol such as GTP.

A home address (HoA) for a mobile node may be received 604 from the gateway node using the first protocol. The first LMA 314 component may receive 604 the HoA for the mobile node. In one embodiment, the HoA is delegated to the first LMA 314. Updates regarding the location of the mobile node within a domain may be received 606 using a second protocol. The first LMA 314 component may receive 606 the updates from the plurality of ARs 316, 318. In one embodiment, the second protocol is an IP based mobility protocol such as PMIP. In one embodiment, intra-domain mobility for the mobile node is managed 608 using the second protocol. The first LMA 314 component may temporarily manage the intra-domain mobility using the IP based mobility protocol (e.g. PMIP).

In another embodiment, the LMA component may communicate with the HA component directly using a third protocol. The third protocol may be a global IP mobility protocol such as MIP. In addition, the LSN component may communicate with the plurality of ARs within the same domain as the LSN. The LSN may communicate with the ARs using the first protocol. In other words, the LSN may communicate with the ARs using a non-IP based protocol such as GTP.

Figure 6A:
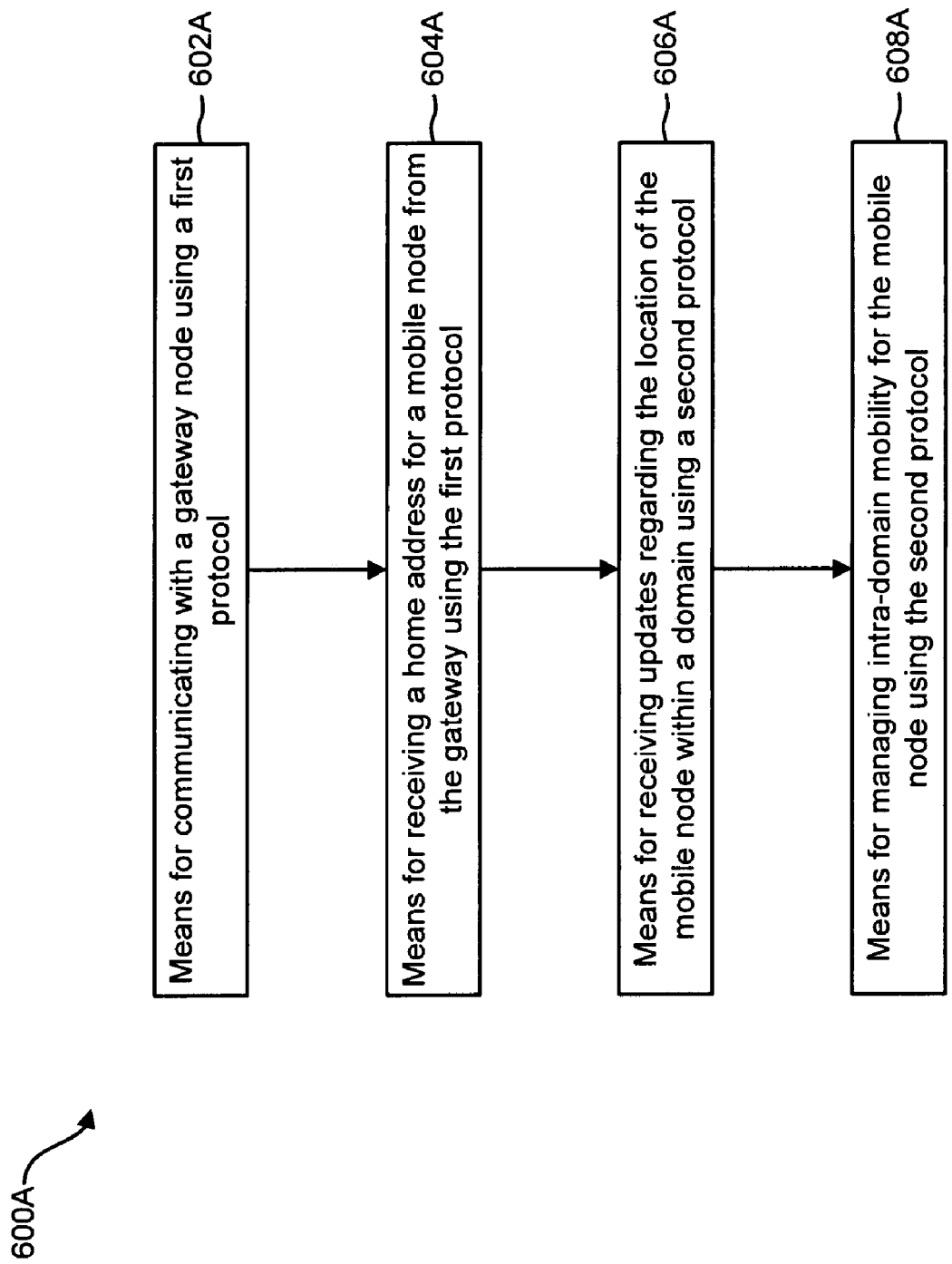
FIG. 6A illustrates means plus function blocks corresponding to the method shown in FIG. 6.

The method 600 of FIG. 6 described above may be performed by corresponding means plus function blocks 600A illustrated in FIG. 6A. In other words, blocks 602 through 608 illustrated in FIG. 6 correspond to means plus function blocks 602A through 608A illustrated in FIG. 6A.

Figure 7:
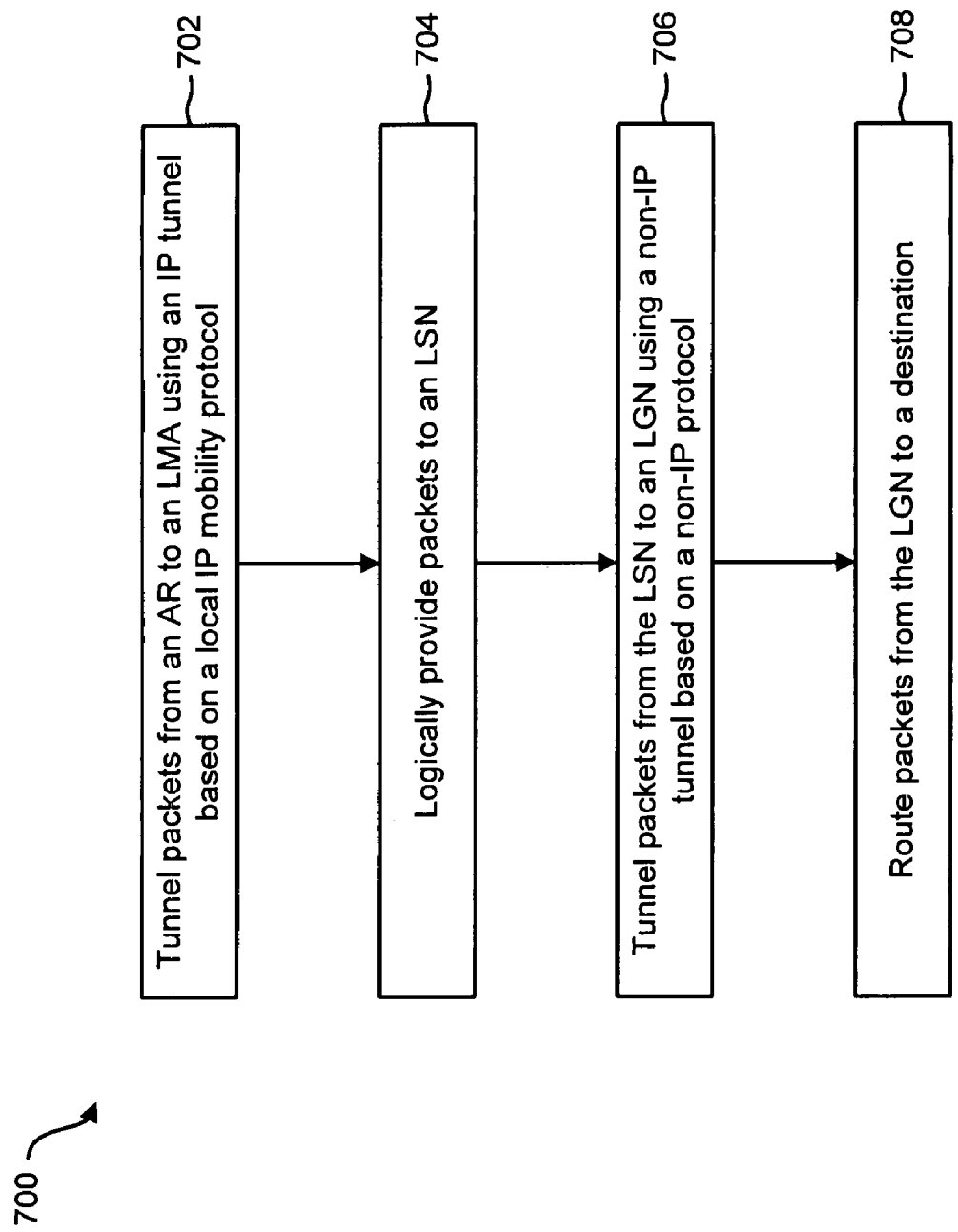
FIG. 7 is a flow diagram illustrating one embodiment of a method for managing data packets on a reverse link from the mobile node.

FIG. 7 is a flow diagram illustrating one embodiment of a method 700 for managing data packets on a reverse link from the mobile node. The data packets may be tunneled 702 from an AR to the LMA using an IP tunnel. The IP tunnel may be based on a local IP mobility protocol such as PMIP. The data packets may be logically provided 704 to the LSN. The data packets may be tunneled 706 from the LSN to an LGN using a non-IP tunnel. The non-IP tunnel may be based on a non-IP protocol such as GTP. The data packets may be routed 708 from the LGN to a destination.

Figure 8:
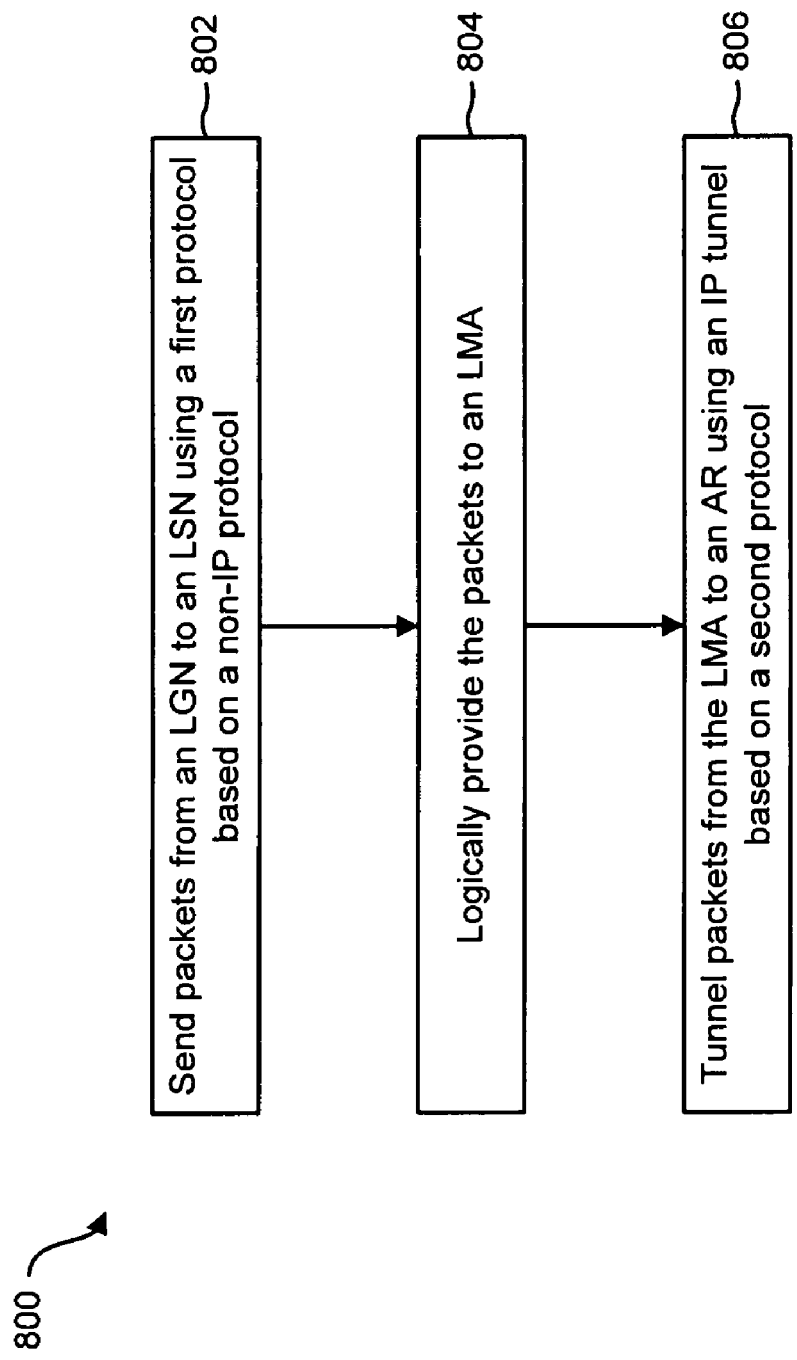
FIG. 8 is a flow diagram illustrating one embodiment of a method for managing data packets on a forward link to the mobile node.

FIG. 8 is a flow diagram illustrating one embodiment of a method 800 for managing data packets on a forward link to the mobile node. The data packets may be sent 802 from an LGN to an LSN using the first protocol. In one embodiment, the first protocol is based on a non-IP protocol such as GTP. The data packets may be logically provided 804 from the LSN to an LMA. The data packets may be tunneled 806 from the LMA to an AR using an IP tunnel. The IP tunnel may be based on a second protocol that is an IP based protocol. The second protocol may be PMIP.

Figure 9:
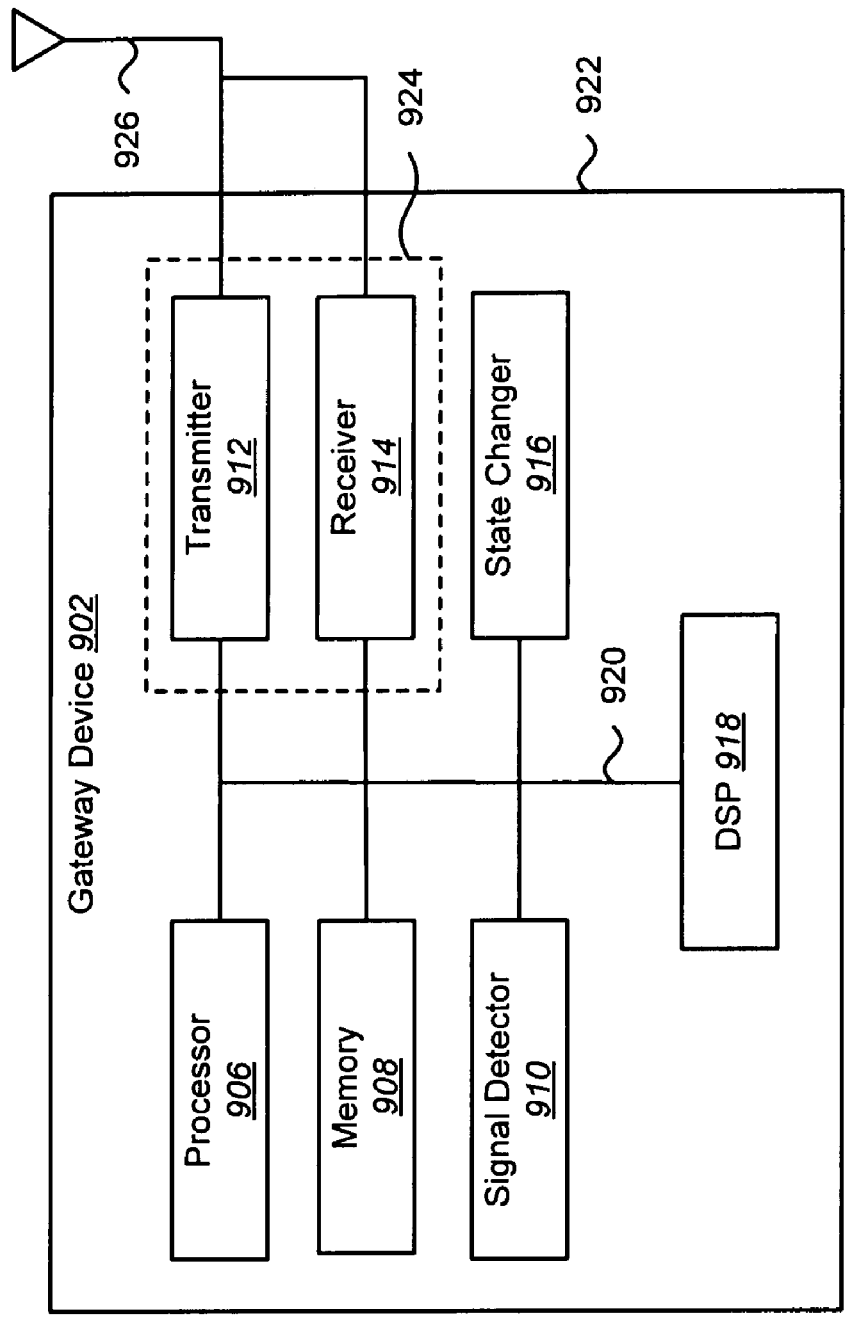
FIG. 9 illustrates various components that may be utilized in a gateway device.

FIG. 9 illustrates various components that may be utilized in a gateway device 902, such as an LSN collocated with an LMA in accordance with one embodiment. The device 902 includes a processor 906 which controls operation of the device 902. The processor 906 may also be referred to as a CPU.

Memory 908, which may include both read-only memory (ROM) and random access memory (RAM), provides instructions and data to the processor 906. A portion of the memory 908 may also include non-volatile random access memory (NVRAM). The memory 908 may include any electronic component capable of storing electronic information, and may be embodied as ROM, RAM, magnetic disk storage media, optical storage media, flash memory, on-board memory included with the processor 906, EPROM memory, EEPROM memory, registers, a hard disk, a removable disk, a CD-ROM, etc. The memory 908 may store program instructions and other types of data. The program instructions may be executed by the processor 906 to implement some or all of the methods disclosed herein.

The device 902 may also include a housing 922 that includes a transmitter 912 and a receiver 914 to allow transmission and reception of data between the device 902 and a remote location. The transmitter 912 and receiver 914 may be combined into a transceiver 924. An antenna 926 is attached to the housing 922 and electrically coupled to the transceiver 924.

The device 902 also includes a signal detector 910 used to detect and quantify the level of signals received by the transceiver 924. The signal detector 910 detects such signals as total energy, power spectral density and other signals.

A state changer 916 of the device 902 controls the state of the device 902 based on a current state and additional signals received by the transceiver 924 and detected by the signal detector 910. The device 902 is capable of operating in any one of a number of states.

The various components of the device 902 are coupled together by a bus system 920 which may include a power bus, a control signal bus, and a status signal bus in addition to a data bus. However, for the sake of clarity, the various busses are illustrated in FIG. 9 as the bus system 920. The device 902 may also include a digital signal processor (DSP) 918 for use in processing signals.

Figure 10:
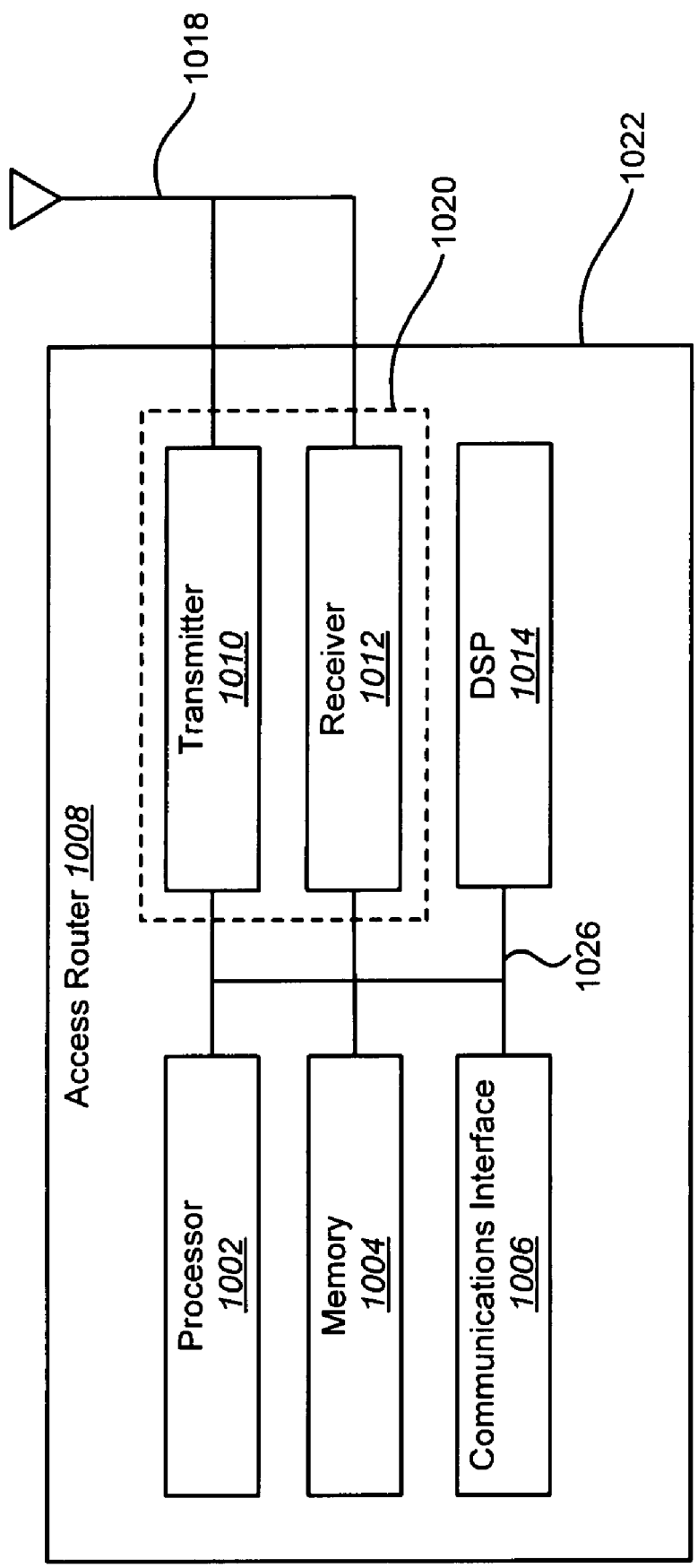
FIG. 10 is a block diagram of an access router in accordance with one embodiment of the disclosed systems and methods.

FIG. 10 is a block diagram of an access router 1008 in accordance with one embodiment of the disclosed systems and methods. Examples of different implementations of an access router 1008 include, but are not limited to, a base station, an eNB, a base station controller, a base station transceiver, etc. The access router 1008 includes a transceiver 1020 that includes a transmitter 1010 and a receiver 1012. The transceiver 1020 may be coupled to an antenna 1018. The access router 1008 further includes a digital signal processor (DSP) 1014, a general purpose processor 1002, memory 1004, and a communication interface 1006. The various components of the access router 1008 may be included within a housing 1022.

The processor 1002 may control operation of the access router 1008. The processor 1002 may also be referred to as a CPU. The memory 1004, which may include both read-only memory (ROM) and random access memory (RAM), provides instructions and data to the processor 1002. A portion of the memory 1004 may also include non-volatile random access memory (NVRAM). The memory 1004 may include any electronic component capable of storing electronic information, and may be embodied as ROM, RAM, magnetic disk storage media, optical storage media, flash memory, on-board memory included with the processor 1002, EPROM memory, EEPROM memory, registers, a hard disk, a removable disk, a CD-ROM, etc. The memory 1004 may store program instructions and other types of data. The program instructions may be executed by the processor 1002 to implement some or all of the methods disclosed herein.

In accordance with the disclosed systems and methods, the antenna 1018 may receive reverse link signals that have been transmitted from a nearby gateway node 902. The antenna 1018 provides these received signals to the transceiver 1020 which filters and amplifies the signals. The signals are provided from the transceiver 1020 to the DSP 1014 and to the general purpose processor 1002 for demodulation, decoding, further filtering, etc.

The various components of the access router 1008 are coupled together by a bus system 1026 which may include a power bus, a control signal bus, and a status signal bus in addition to a data bus. However, for the sake of clarity, the various busses are illustrated in FIG. 10 as the bus system 1026.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described in connection with the embodiments disclosed herein may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. An exemplary storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is required for proper operation of the embodiment that is being described, the order and/or use of specific steps and/or actions may be modified without departing from the scope of the claims.

Functions such as executing, processing, performing, running, determining, notifying, sending, receiving, storing, requesting, and/or other functions may include performing the function using a web service. Web services may include software systems designed to support interoperable machine-to-machine interaction over a computer network, such as the Internet. Web services may include various protocols and standards that may be used to exchange data between applications or systems. For example, the web services may include messaging specifications, security specifications, reliable messaging specifications, transaction specifications, metadata specifications, XML specifications, management specifications, and/or business process specifications. Commonly used specifications like SOAP, WSDL, XML, and/or other specifications may be used.

While specific embodiments have been illustrated and described, it is to be understood that the claims are not limited to the precise configuration and components illustrated above. Various modifications, changes and variations may be made in the arrangement, operation and details of the embodiments described above without departing from the scope of the claims.

The invention claimed is:

1. A method for using Internet mobility protocols with non-Internet mobility protocols, comprising:
    communicating, by a second gateway node, with a first gateway node using a first protocol, wherein:
        the first protocol is a non-Internet mobility protocol,
        the first gateway node comprises a legacy gateway node collocated with a home agent, and
        the second gateway node comprises a legacy servicing node collocated with a local mobility agent;
    managing, by the second gateway node, a home address (HoA) for a mobile node;
    receiving, by the second gateway node, updates from one or more access routers regarding a location of the mobile node within a domain using a second protocol,
        wherein the second protocol is an Internet mobility protocol; and
    managing, by the second gateway node, intra-domain mobility for the mobile node using the second protocol.

2. The method of claim 1, wherein the legacy servicing node comprises a servicing general packet radio services support node (SGSN).

3. The method of claim 1, wherein the legacy servicing node comprises an Evolved Packet System (EPS) serving gateway node (SGW).

4. The method of claim 1, wherein the first protocol comprises a general packet radio services tunneling protocol (GTP).

5. The method of claim 1, wherein the second protocol comprises a Proxy Mobile Internet Protocol (PMIP).

6. The method of claim 1, wherein the second protocol comprises a Mobile Internet Protocol (MIP).

7. The method of claim 1, further comprising:
    receiving data packets at the local mobility agent from an access router using an Internet Protocol (IP) based tunnel;
    providing the data packets to the legacy servicing node; and tunneling the data packets from the legacy servicing node to the legacy gateway node using a non-IP tunnel.

8. The method of claim 1, further comprising:
receiving data packets at the legacy servicing node from the legacy gateway node using a non-IP tunnel;
providing the data packets to the local mobility agent; and
tunneling the data packets to a corresponding access router using an IP based tunnel.

9. The method of claim 1, further comprising using the second protocol for communications between the local mobility agent and the home agent.

10. The method of claim 1, further comprising using the first protocol for communications between the legacy servicing node and one or more access routers.

11. A second gateway node that is configured to use Internet mobility protocols with non-Internet mobility protocols, the gateway node comprising:
a processor;
memory in electronic communication with the processor;
instructions stored in the memory, the instructions being executable to:
communicate with a first gateway node using a first protocol, wherein:
the first protocol is a non-Internet mobility protocol,
the first gateway node comprises a legacy gateway node collocated with a home agent, and
the second gateway node comprises a legacy servicing node collocated with a local mobility agent;
manage a home address (HoA) for a mobile node;
receive updates from one or more access routers regarding a location of the mobile node within a domain using a second protocol, wherein the second protocol is an Internet mobility protocol; and
manage intra-domain mobility for the mobile node using the second protocol.

12. The second gateway node of claim 11, wherein the legacy servicing node comprises a servicing general packet radio services support node (SGSN).

13. The second gateway node of claim 11, wherein the legacy servicing node comprises an Evolved Packet System (EPS) serving gateway node (SGW).

14. The second gateway node of claim 11, wherein the first protocol comprises a general packet radio services tunneling protocol (GTP).

15. The second gateway node of claim 11, wherein the second protocol comprises a Proxy Mobile Internet Protocol (PMIP).

16. The second gateway node of claim 11, wherein the second protocol comprises a Mobile Internet Protocol (MIP).

17. The second gateway node of claim 11, wherein the instructions are further executable to:
receive data packets from an access router using an Internet Protocol (IP) based tunnel;
provide the data packets to the legacy servicing node; and
tunnel the data packets from the legacy servicing node to the legacy gateway node using a non-IP tunnel.

18. The second gateway node of claim 11, wherein the instructions are further executable to:
receive data packets at the legacy servicing node from the legacy gateway node using a non-IP tunnel;
provide the data packets to the local mobility agent; and
tunnel the data packets to a corresponding access router using an IP based tunnel.

19. The second gateway node of claim 11, wherein the instructions are further executable to use the second protocol for communications with the home agent.

20. The second gateway node of claim 11, wherein the instructions are further executable to use the first protocol for communications between the legacy servicing node and one or more access routers.

21. A non-transitory computer-program product for using Internet mobility protocols with non-Internet mobility protocols, the computer-program product comprising a computer-readable medium having instructions thereon, the instructions executable by a processor to:
communicate, by a second gateway node, with a first gateway node using a first protocol, wherein:
the first protocol is a non-Internet mobility protocol,
the first gateway node comprises a legacy gateway node collocated with a home agent, and
the second gateway node comprises a legacy servicing node collocated with a local mobility agent;
manage, by the second gateway node, a home address (HoA) for a mobile node;
receive, by the second gateway node, updates from one or more access routers regarding a location of the mobile node within a domain using a second protocol, wherein the second protocol is an Internet mobility protocol; and
manage, by the second gateway node, intra-domain mobility for the mobile node using the second protocol.

22. A second gateway node for using Internet mobility protocols with non-Internet mobility protocols, the second gateway node comprising:
means for communicating with a first gateway node using a first protocol, wherein:
the first protocol is a non-Internet mobility protocol
the first gateway node comprises a legacy gateway node collocated with a home agent, and
the second gateway node comprises a legacy servicing node collocated with a local mobility agent;
means for managing a home address (HoA) for a mobile node;
means for receiving updates from one or more access routers regarding a location of the mobile node within a domain using a second protocol, wherein the second protocol is an Internet mobility protocol; and
means for managing intra-domain mobility for the mobile node using the second protocol.

* * * * *